Patented Dec. 1, 1931

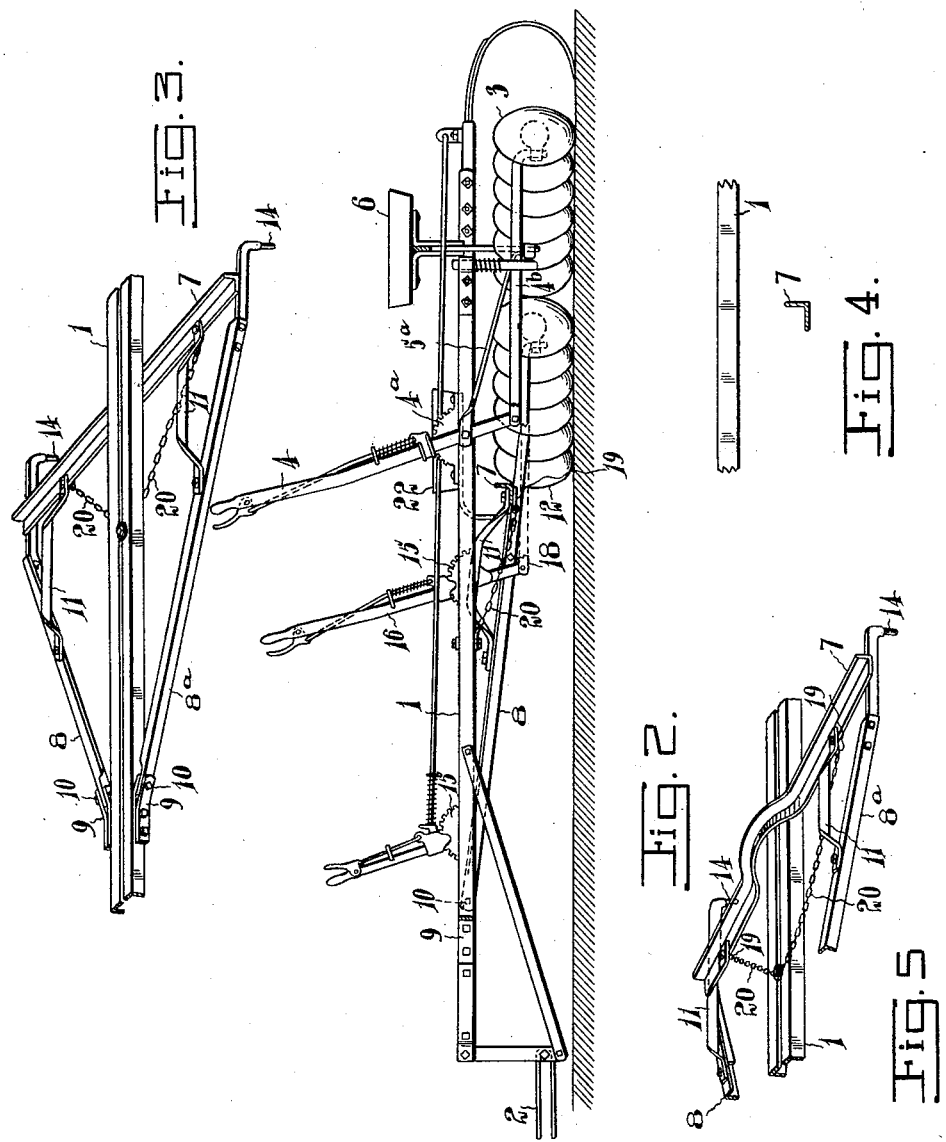

1,834,484

UNITED STATES PATENT OFFICE

LLOYD EDWARD BISSELL, OF ELORA, ONTARIO, CANADA, ASSIGNOR TO T. E. BISSELL COMPANY LIMITED, OF ELORA, CANADA, A CORPORATION OF CANADA

DISK HARROW

Application filed September 17, 1930. Serial No. 482,599.

My invention relates to a disk harrow characterized by:—a center frame; an auxiliary frame comprising a spacing bar arranged transversely to the center frame; and drawbars connecting the spacing bar with the center frame for the undulating movement of the spacing bar independently of the undulating movement and weight of the center frame; and a plurality of disk gangs arranged in several separate groups, one of which is connected to the center frame in rear of the auxiliary frame, the other is connected to the spacing bar, and the disk gangs of each group are evenly disposed at opposite sides of the center frame; the object of the invention being:—(a) to enable each disk gang and each group of disk gangs freely following the contour of the ground and cutting to the predetermined depth independently of the other disk gangs; and (b) to limit the lateral movement of the spacing bar, assist its turning movements and maintain the disk gangs connected with it in their properly spaced relation to those connected with the center frame.

For an understanding of the invention reference is to be had to the following description and to the accompanying drawings in which:—

Fig. 2 is a sectional elevation on the line 2—2 Fig. 1;

Fig. 3 is a perspective view of the auxiliary frame;

Fig. 4 is a fragmentary vertical section showing the spacing bar below the center frame; and Fig. 5 is a perspective view showing the spacing bar above the center frame.

Like characters of reference refer to like parts throughout the specification and drawings.

Figure 1:
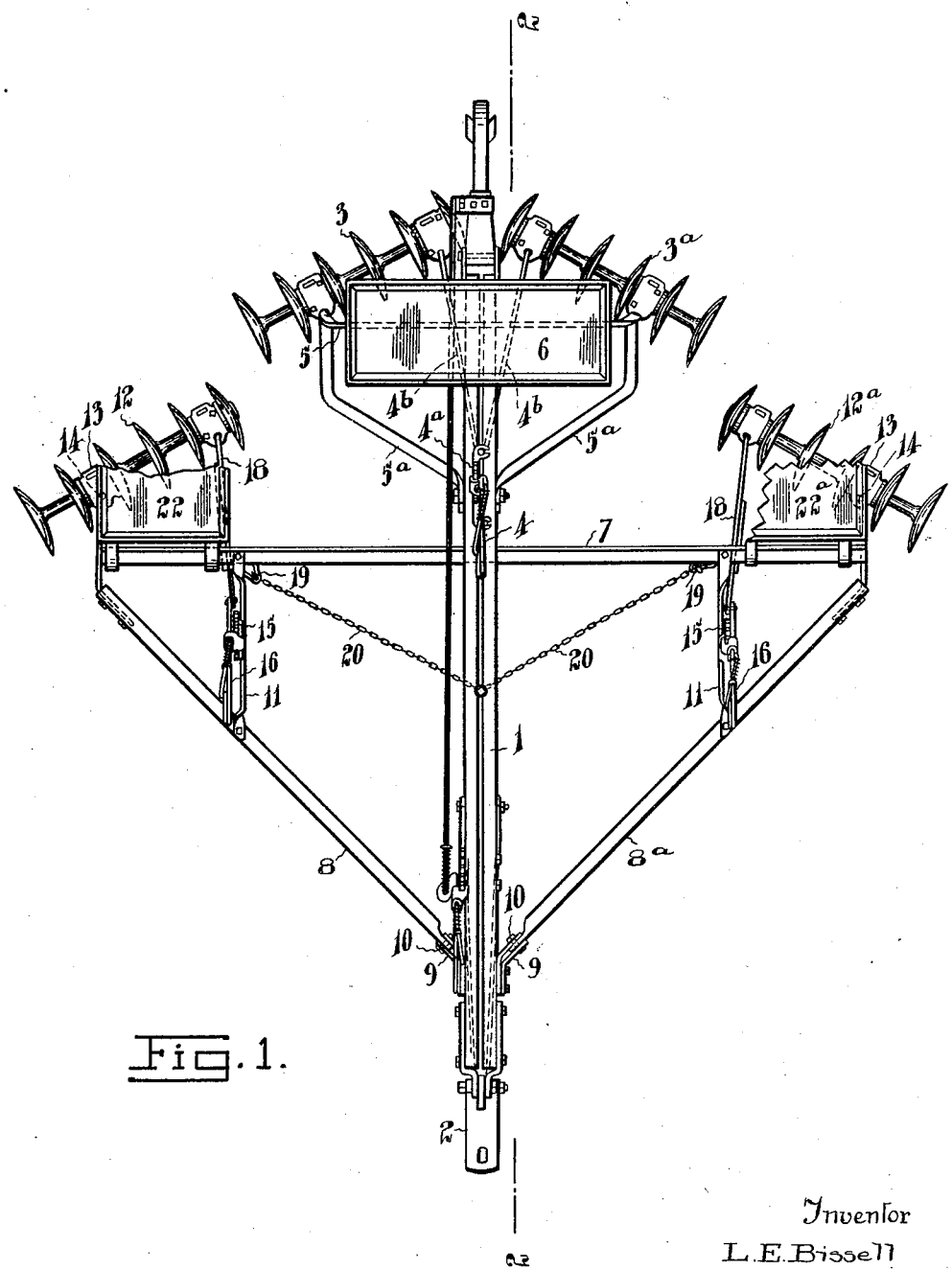
Fig. 1 is a plan view of a harrow constructed according to this invention showing the spacing bar below the center frame.

The disk harrow shown in the drawings comprises a center frame, an auxiliary frame undulatingly connected with the center frame, and a plurality of disk gangs arranged in two separate groups. The center frame 1 takes the form of an angle iron pole extending lengthwise of the line of draft and is provided at its forward end with a coupling 2 for attaching the harrow to a tractor or other draft apparatus. The disk gangs 3, 3a constitute one group, coupled together by a beam 5 and connected with the center frame by drawbars 5a and these disk gangs are arranged one at each side of the center frame at or near its rear end. A lever 4 and toothed segment 4a are mounted on the center frame forward of these disk gangs and the lever is connected with each gang by a rod 4b for adjusting the cutting angle of the group to the line of draft. A box 6 is supported from the center frame above the beam 5 in which may be deposited weights or heavy material for determining the depth of cut of the disks of this group.

The auxiliary frame is connected to the center frame in advance of the disk gangs 3, 3a and comprises a spacing bar 7 which is shown in Figs. 1 to 4 to be located below the center frame, and in Fig. 5 to be located above the center frame and in both constructions arranged transversely to the line of draft, and extended evenly beyond each side of the center frame, two drawbars 8, 8a connected to the spacing bar one at each side of the center frame and extending diagonally forward, and two vertically disposed axles 14 at the ends of and in rear of the spacing bar.

Forked brackets 9 are secured to the center frame adjacent to and in rear of the coupling 2 and the forward ends of the drawbars 8, 8a are entered between the forks 9a of the brackets and secured to them by bolts 10 for rockably connecting the auxiliary frame to the center frame and permitting the two frames and their respective disk gangs to undulate or move vertically independently of each other. The disk gangs 12, 12a constitute the other group and are located one at each end of the spacing bar by which they are securely maintained in their spaced relation to each other and to the disk gangs of the other group. Each disk gang 12, 12a is constructed with a bearing 13 in which the axles 14 are entered for pivotally connecting the disk gangs to the spacing bar. Opposite each disk gang of the group 12, 12a is a brace 11 rigidly secured to the spacing bar and to the corresponding drawbar, and mounted upon each brace 11 is a toothed segment 15 and a lever 16 connected with its respective disk gang by a rod 18 for adjusting the cutting angle of the gang to the line of draft. Connected to the spacing bar are two eyes 19 located one at each side of the center frame and secured to the center frame in advance of the spacing bar are two flexible stays 20 which are entered through the eyes 19 for limiting the lateral movement of the spacing bar with respect to the center frame, and assisting the turning movement of the spacing bar and the disk gangs 12, 12a thereby enabling the spacing bar to maintain the disk gangs 12, 12a in their proper lateral relation to the disk gangs 3, 3a without interfering with the undulating or vertical movement of either the center or auxiliary frame.

Supported from the spacing bar are two boxes 22, 22a located above the disk gangs 12, 12a respectively in which may be placed weights or heavy material for determining the cutting depth of the disks of those gangs.

By means of this construction there is no connection between the spacing bar and center frame other than the drawbars and flexible stays and neither the center frame nor the spacing bar and their respective groups of disk gangs imposes any weight on the other and the disk gangs of each group can rise and fall independently of each other as they follow the contour of the land and each disk gang can cut uniformly to a predetermined depth without restraint and without imposition of weight by any other disk gang or group of disk gangs and its corresponding frame.

Having thus fully described my invention what I claim as new and desire to secure by Letters Patent is:—

1. In a disk harrow a center frame, and an auxiliary frame comprising a spacing bar arranged transversely to the center frame and drawbars connecting the spacing bar with the center frame for the undulation of the spacing bar and center frame independently of and free from the weight of each other, and flexible stays connected to the spacing bar at opposite sides of the center frame and to the center frame in advance of the spacing bar for limiting the lateral movement of the spacing bar with relation to the center frame and for assisting its turning movement.

2. In a disk harrow a center frame, an auxiliary frame comprising a spacing bar arranged transversely to the center frame, forwardly extending drawbars connecting the spacing bar with the center frame for the undulating movement of the spacing bar, disk gangs connected with the center frame, and other disk gangs connected with the spacing bar, each frame and its respective disk gangs undulating independently of and free from the weight of the other, and flexible stays connected to the spacing bar at opposite sides of the center frame and to the center frame in advance of the spacing bar for limiting the lateral movement of the spacing bar with relation to the center frame and for assisting its turning movement.

3. In a disk harrow a center frame, an auxiliary frame comprising a spacing bar arranged transversely to the center frame and drawbars connecting the spacing bar with the center frame for the undulating movement of the spacing bar and center frame independently of and free from the weight of each other, and a plurality of disk gangs arranged in separate groups of which the disk gangs of one group are connected to the center frame and the disk gangs of the other group are connected to the auxiliary frame and evenly arranged at opposite sides of the center frame, and flexible stays connected to the spacing bar at opposite sides of the center frame and to the center frame in advance of the spacing bar for limiting the lateral movement of the spacing bar with relation to the center frame and for assisting its turning movement.

Dated at Elora this 21st day of August, 1930.

LLOYD EDWARD BISSELL.